United States Patent
Shijo et al.

(10) Patent No.: US 7,170,626 B2
(45) Date of Patent: Jan. 30, 2007

(54) IMAGE PROCESSING APPARATUS MANAGEMENT METHOD AND IMAGE PROCESSING APPARATUS

(75) Inventors: Kunio Shijo, Tokyo (JP); Kazuhiro Takemoto, Tokyo (JP); Tetsuo Kimoto, Tokyo (JP); Tomoya Yoshida, Tokyo (JP); Kei Yamada, Tokyo (JP)

(73) Assignee: Konica Corporation, Tokyo (JP)

( * ) Notice: Subject to any disclaimer, the term of this patent is extended or adjusted under 35 U.S.C. 154(b) by 846 days.

(21) Appl. No.: 10/207,162

(22) Filed: Jul. 29, 2002

(65) Prior Publication Data
US 2003/0035137 A1 Feb. 20, 2003

(30) Foreign Application Priority Data
Aug. 7, 2001 (JP) ............... 2001-239751

(51) Int. Cl.
G06F 15/00 (2006.01)
(52) U.S. Cl. ............... 358/1.15; 358/1.13
(58) Field of Classification Search ............... 358/1.15, 358/1.18; 705/7, 14; 709/203, 224; 399/407, 399/391; 422/99, 100; 400/118.2, 578; 270/58.18; 271/298, 176
See application file for complete search history.

(56) References Cited

U.S. PATENT DOCUMENTS 6,738,841 B1 * 5/2004 Wolff ............... 710/62

2001/0029531 A1 * 10/2001 Ohta ............... 709/223
2002/0016836 A1 * 2/2002 Suzuki et al. ............... 709/223

FOREIGN PATENT DOCUMENTS

| JP | 01-312557 | 2/1989 |
|---|---|---|
| JP | 02-137858 | 5/1990 |
| JP | 05-035014 | 2/1993 |
| JP | 05-336323 | 12/1993 |

\* cited by examiner

Primary Examiner—King Y. Poon
Assistant Examiner—Saeid Ebrahimi
(74) Attorney, Agent, or Firm—Frishauf, Holtz, Goodman & Chick P.C.

(57) ABSTRACT

An image processing apparatus management method wherein an external management apparatus manages an image processing apparatus via an information communications terminal, having the steps of transmitting to the external management apparatus inputted first identification information inherent to the image processing apparatus and second identification information stored in the information communications terminal in advance; authenticating the transmitted second identification information based on second identification information previously stored in the management apparatus; acquiring operation information of the image processing apparatus previously stored being associated with the first identification information; transmitting to the information communications terminal the operation information of the image processing apparatus; accepting the input of the operation information of the image processing apparatus sent through the information communications terminal; and performing the specified operation corresponding to the operation information of the image processing apparatus.

4 Claims, 5 Drawing Sheets

IMAGE FORMING APPARATUS

MACHINE ID (EXAMPLE)

| PRODUCT NUMBER | | | | SERIAL NUMBER | | | | | |
|---|---|---|---|---|---|---|---|---|---|
| 5 | 5 | G | A | 1 | 2 | 3 | 4 | 5 | 6 |

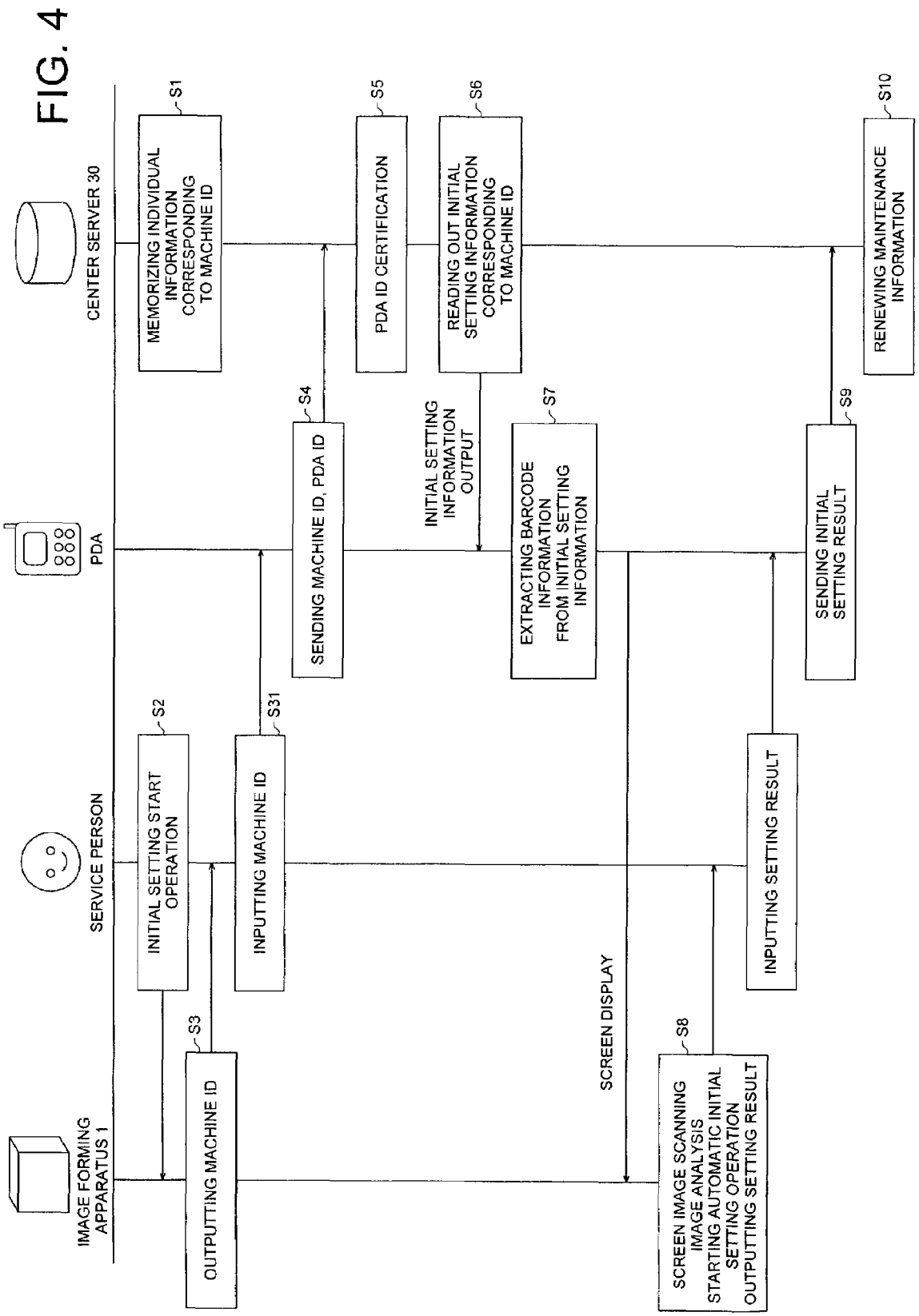

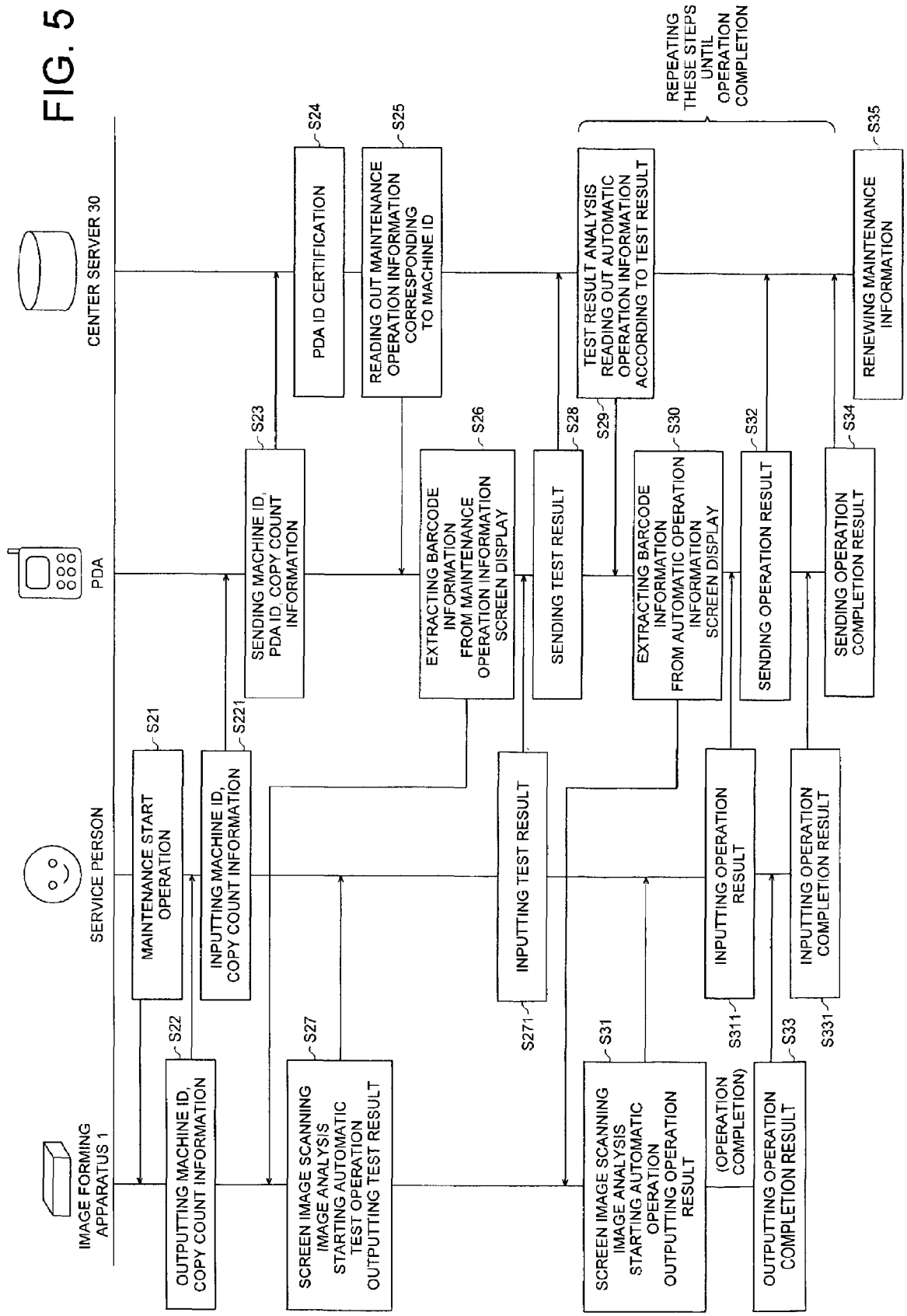

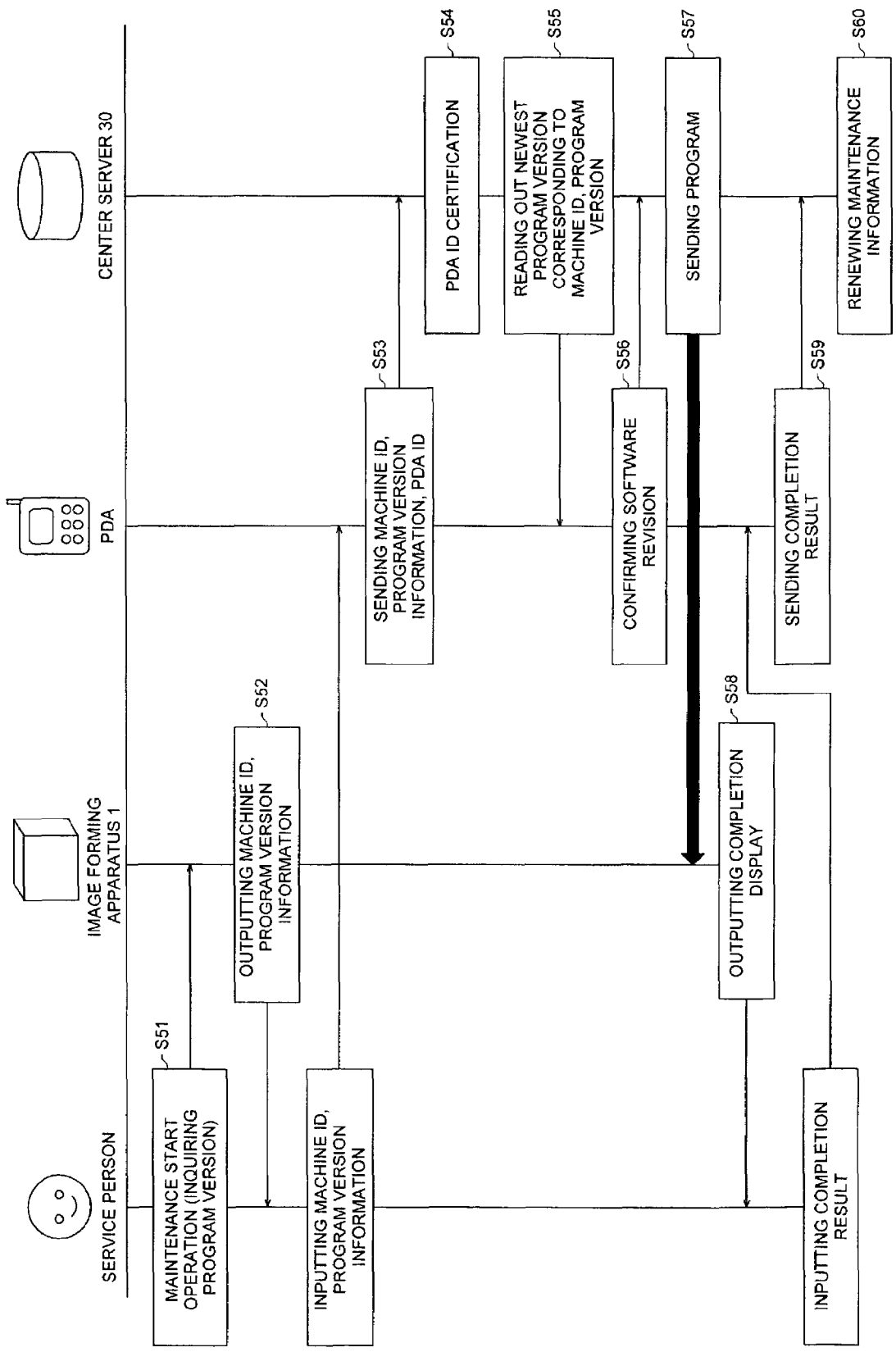

IMAGE PROCESSING APPARATUS MANAGEMENT METHOD AND IMAGE PROCESSING APPARATUS

BACKGROUND OF THE INVENTION

The present invention relates to the method for managing an image processing apparatus via a communications network and image processing apparatus.

For the maintenance of the image forming apparatus of a copying machine and facsimile machine, communications technique and barcodes are used to control the operation of the image forming apparatus in some cases in recent years. For example, TOKKAIHEI No. P05-35014A discloses a technique wherein an external device storing operation data created by manual procedures or others is connected to an image forming apparatus and the stored data is displayed for guidance on the image forming apparatus.

Further, TOKKAIHEI No. P05-336323A discloses an image forming apparatus control method wherein image formation is enabled by a barcode read by a barcode reader, instead of a key counter or key card which allows copying when mounted on a copying machine.

Furthermore, for initialization of the image forming conditions required for replacement of photoconductor and other parts, a barcode is attached on the replacement part and side place of the apparatus in advance. This barcode is read at the time of parts replacement, thereby allowing the image forming conditions to be initialized (as disclosed in TOKKAIHEI Nos. P02-137858A and P01-312557A).

However, according to the inventions disclosed in the above-mentioned publications, it was not possible to make a setting specific to each image processing apparatus. When it was necessary to make a setting based on the operation history of each image processing apparatus, especially at the time of maintenance by a service person, it was essential to check the operation history of the image processing apparatus before setting of individual functions. As a result, the maintenance work was very complicated. An image processing apparatus provided with communications means and capable of communication with a center server via a network and telephone line has introduced into the market in recent years. This apparatus allows control commands to be sent from the center server located in a remote place to the image processing apparatus, and information on operation history to be sent back from this image processing apparatus to the center server, and enables the above-mentioned setting.

However, if a firewall was installed between the LAN (Local Area Network) connected with the image processing apparatus and WAN (Wide Area Network) represented by the Internet connected with the center server in order to prevent leakage of secret information communicated only by the LAN and to cut off the transmission of control command sent to the LAN-connected equipment by a malicious person connected to the WAN, the control command sent from the center server was often cut off by this firewall and setting work was disabled. Further, such setting work was impossible in the image processing apparatus if not provided with communications means.

The object of the present invention is to provide a management method for ensuring automatic operation control of an image processing apparatus in a management system comprising an image processing apparatus connected by a communications network, a management apparatus and an information communications terminal. Another object of the present invention is to provide a management method for allowing effective management of an image processing apparatus unconnected to a communications network, using an information communications terminal.

SUMMARY OF THE INVENTION

The following describes the configuration of the present invention for achieving the above-mentioned objects:

(1) An image processing apparatus management method wherein an external management apparatus manages an image processing apparatus via an information communications terminal;

the aforementioned image processing apparatus management method characterized by comprising;

a step of transmitting to the management apparatus the input first identification information inherent to the aforementioned image processing apparatus and the second identification information stored in the aforementioned information communications terminal in advance, in an information communications terminal;

a step of authenticating the aforementioned transmitted second information based on the second identification information previously stored in the aforementioned management apparatus, in the management apparatus;

a step of acquiring the information of the image processing apparatus previously stored in the form associated with the aforementioned first identification information sent in the above step;

a step of sending to the information communications terminal the information on the image processing apparatus operation acquired in the aforementioned step;

a step of accepting the input of the information on the image processing apparatus operation sent through the information communications terminal, in the image processing apparatus; and a step wherein the image processing apparatus performs the specified operation corresponding to the aforementioned information on the image processing apparatus operation.

(2) An image processing apparatus management method wherein an external management apparatus manages an image processing apparatus via an information communications terminal;

the aforementioned image processing apparatus management method characterized by comprising;

a step of transmitting to the management apparatus the input first identification information inherent to the aforementioned image processing apparatus and the second identification information stored in the aforementioned information communications terminal in advance, in an information communications terminal;

a step of authenticating the aforementioned transmitted second information based on the second identification information previously stored in the aforementioned management apparatus, in the management apparatus;

a step of acquiring the information of the image processing apparatus previously stored in the form associated with the aforementioned first identification information sent in the above step;

a step of sending to the information communications terminal the information on the image processing apparatus operation acquired in the aforementioned step;

a step of displaying on display means of the information communications terminal the image information based on the information on the image processing apparatus operation sent in the above step, in the information communications terminal;

a step wherein the image processing apparatus reads out the aforementioned displayed image information and analyze it, in the image processing apparatus; and a step wherein the image processing apparatus performs the specified operation corresponding to the information on the image processing apparatus operation based on the result of analysis made in the above step.

(3) An image processing apparatus management method according to (1) characterized in that the operation in the aforementioned information on the image processing apparatus operation comprises at least one of the following operations;

an operation of storing into storage means of the aforementioned management apparatus the user information on the user owning the aforementioned image processing apparatus, an operation of changing the setting of the aforementioned image processing apparatus, an operation of outputting the status of the aforementioned image processing apparatus, and operation of carrying out self-maintenance of the aforementioned image processing apparatus.

(4) An image processing apparatus management method according to (1) characterized in that;

the aforementioned image processing apparatus comprises a step of acquiring the result of operation in conformity to the aforementioned information on the image processing apparatus operation the aforementioned information communications terminal comprises a step of sending the aforementioned result of operation to the management apparatus, and the aforementioned management apparatus comprises a step of recording the result of the aforementioned operation.

(5) An image processing apparatus management method according to (4) characterized in that;

the aforementioned management apparatus comprises a step of acquiring time information, and a step of generating management information based on the aforementioned result of the operation and the time information acquired in the above step; and the aforementioned result of analysis contains at least the aforementioned management information.

(6) An image processing apparatus comprising;

image reading means for reading image information, operation information storing means for memorizing operation information associated with the aforementioned image information, image analyzing means for analyzing the aforementioned readout image information, operation control means for reading from the aforementioned storage means the operation information corresponding to the aforementioned analyzed image and for perform operation, operation result information generating means for generating as operation result information the result of performing the operation through the aforementioned operation control means, and output means for outputting the operation result information generated above.

According to configurations (1) to (3), a management apparatus previously stores the operation performed by an image processing apparatus in the form associated with image information, and the image information acquired by an information communications terminal from the management apparatus is displayed on display means, so that the image processing apparatus reads out the displayed image information and performs corresponding operation automatically. This eliminates the complicated work that would require a service man to perform input operations sequentially for adjustment and repair, and substantially cuts down the maintenance time.

According to configurations (4) and (5), the management apparatus manages the result of operations performed by the image processing apparatus. This provides correct information on the maintenance status of the image processing apparatus and service status by the service person.

According to the configuration (6), the operation corresponding to the image information read by the image processing apparatus is automatically performed, with the result that input operation by the service person is eliminated and work efficiency is improved. Further, the image processing apparatus automatically generates the operation result information, with the result that creation of a work report by the service person is eliminated and the service person workload is reduced.

BRIEF DESCRIPTION OF THE DRAWINGS

FIG. 4 is a ladder diagram describing the processing of initial setting to be executed among the image forming apparatus 1 of FIG. 1, center server 20 and PDA20 carried by the service person;

FIG. 5 is a ladder diagram describing the processing of maintenance to be performed among the image forming apparatus 1 of FIG. 1, center server 20 and PDA20 carried by a service person; and FIG. 6 is a ladder diagram describing the processing of program renewing to be performed among the image forming apparatus 1 of FIG. 1, center server 20 and PDA50 carried by the service person.

DETAILED DESCRIPTION OF THE PREFERRED EMBODIMENT

Figure 1:
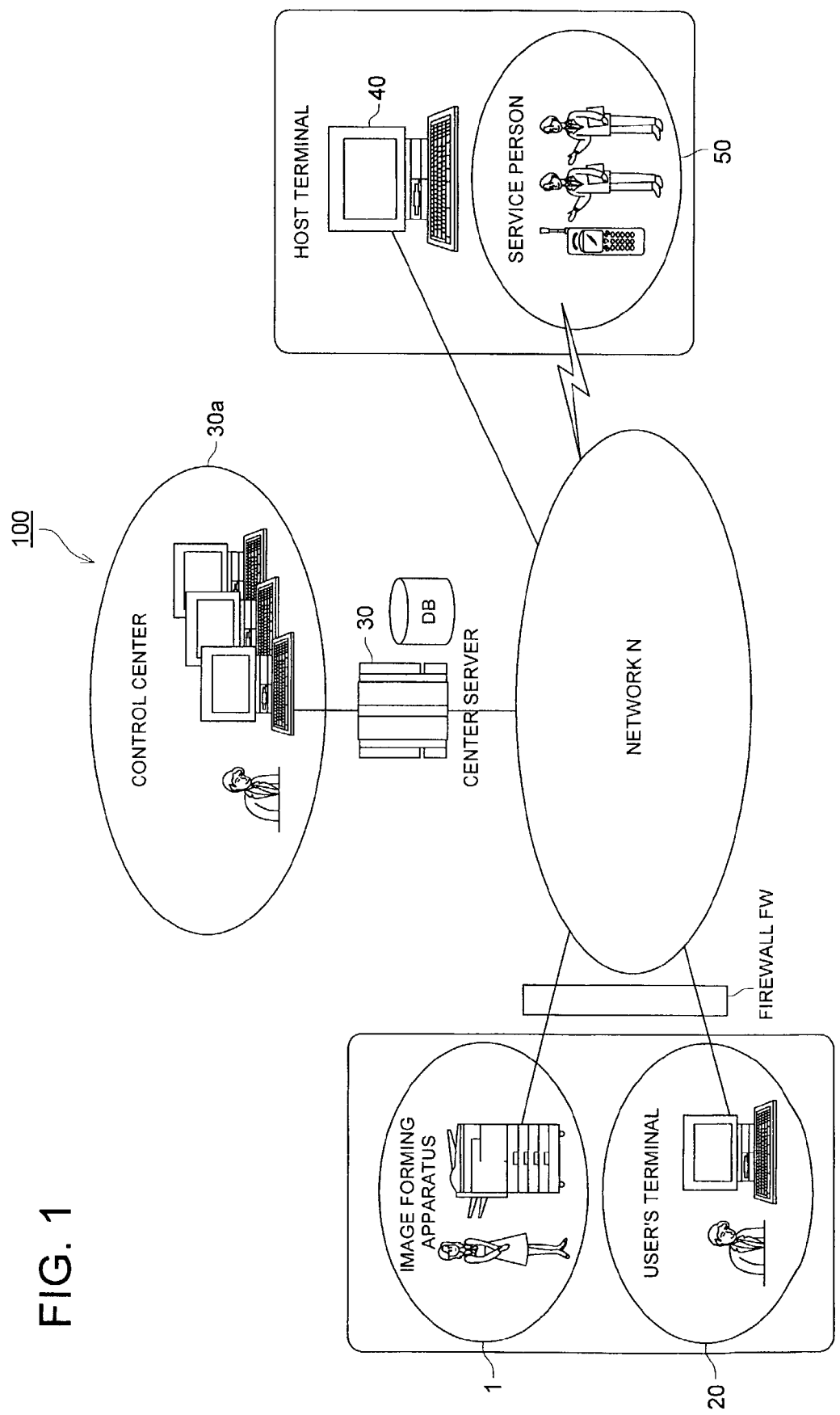
FIG. 1 is a diagram representing an overall configuration of a management system 100 as an embodiment of the present invention.

The following describes embodiments of the management method according to the present invention, with reference to FIGS. 1 to 6:

The configuration will be described first:

FIG. 1 is a diagram representing an overall configuration of a management system 100 as an embodiment of the present invention.

A shown in FIG. 1, the management system 100 is configured in such a way that an image forming apparatus 1, a user management terminal 20 for controlling the image forming apparatus 1, a center server 30 for managing the operation control information of the image forming apparatus 1, a management center 30*a* comprising a terminal for managing the center server 30, a host terminal 40 of a service company taking charge of maintenance work of the image forming apparatus 1, and a PDA50 carried by the service person for performing maintenance of the image forming apparatus 1 are connected to exchange data among them via a network N.

The image forming apparatus 1 as a managed apparatus in the management system 100 is linked to a user management terminal 20 via an in-house line such as LAN (Local Area Network) comprising a firewall function, and the status of its usage is managed. Further, the image forming apparatus 1 has a data communication function of sending and receiving data from the center server 30 via the network N.

The user management terminal 20 is a computer comprising a firewall FW and linked to the image forming apparatus 1 through the in-house line such as LAN and is used to manage the image forming apparatus 1. The user management terminal 20 has a function of receiving the management information of the image forming apparatus 1 from the center server 30 through the network N. The firewall FW is a function provided between the LAN and network N, and is supplied in the form of a computer software or network linking equipment such a router. It prevents leakage of secret information communicated only by the LAN and cuts off the transmission of control command sent to the LAN-connected equipment by a malicious person connected to the network N. To put it more specifically, it provides functions of cutting off the access to the LAN-linked image forming apparatus 1 and user management terminal from the computer connected to the network N, restricting the computer connected to the LAN that permits communications via the network N, restricting the services provided through network N that can be utilized from the LAN-linked computer or image forming apparatus 1, and detecting and eliminating the computer viruses sent through network N.

The center server 30 as a management apparatus in the management system 100 is a computer comprising a CPU, storage unit and others, and is installed at a management center 30a. The center server 30 associates the barcode as image information with the operation performed by the image forming apparatus 1, and memorizes it as operation information. It also received from the PFA50 the identification information of image forming apparatus 1 and PDA50 carried by a service person and operation result information, and manages such information.

The PDA (Personal Digital Assistant) 50 as an information communications terminal in the management system 100 is carried by the service person and is equipped with a communications function and display means. The PDA50 has a data communications function of sending and receiving data among the user management terminal 20, center server 30 and host terminal 40 via the network N.

The network N is a communications network specifically designed for management of an image forming apparatus configured by using a leased line or existing general public line. It allows application of various forms of lines such as WAN (Wide Area Network) and Internet. Further, wired connection among terminals except for PDA50 is shown in FIG. 1, and wireless connection is also possible.

Figures 2, 3:
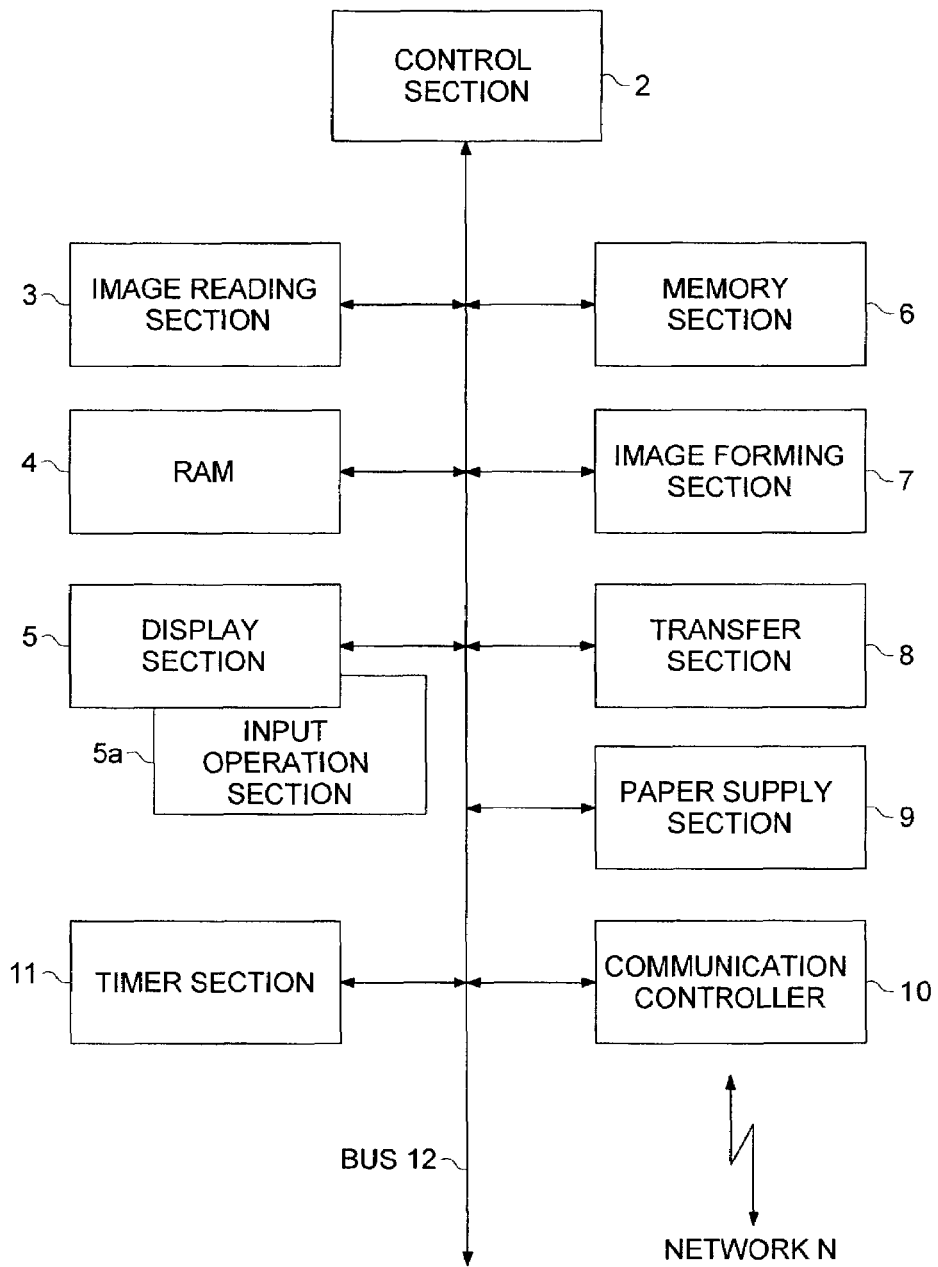
FIG. 2 is a block diagram representing the internal configuration of an image processing apparatus 1 in FIG. 1.
FIG. 3 is a diagram showing an example of the machine ID as identification information of the image forming apparatus in FIG. 1.

The following describes the details of the internal configuration of the image forming apparatus 1 with reference to FIG. 2. FIG. 2 is a block diagram representing the functional configuration of an image processing apparatus 1. As shown in FIG. 2, the image forming apparatus 1 comprises a control section 2, an image reading section 3, a RAM 4, a display section 5 comprising an input operation section, a memory section 6, an image forming section 7, a transfer section 8, a paper supply section 9, and communication controller 10. These sections are connected by a bus.

The control section 2 comprises a CPU (central processor unit) and others. It reads out a program stored in the memory section 6, displays it on the RAM 4 and provides a centralized control of various sections according to this program. Namely, the control section 2 carries out various forms of processing related to image formation, stores the result of processing into the RAM 4, and displays it on the display section 5. The result of processing stored in the RAM 4 is saved in a specified storage area in the memory section 6.

Upon receipt of signals for initial setting start operation performed by the service person, the controller 2 outputs to the display section 5 the machine ID as the first identification information inherent to the apparatus itself. The image reading section 3 reads and analyzes the barcode representing the image information displayed on the display means of the PDA50, and extracts the initial setting information as operation information corresponding to the barcode. Based on the initial setting information, the initial setting operation is performed. Upon completion of the initial setting, the time information gained from the timer section 11 and the code information corresponding to the result of setting completion are generated and displayed on the display section 5 as operation result information together with the initial setting result.

Upon receipt of a signal for maintenance start operation performed by the service person in the processing of maintenance to be described later, the controller 2 outputs to the display section 5 the machine ID as the first identification information inherent to the apparatus itself. The image reading section 3 reads and analyzes the barcode representing the image information displayed on the display means of the PDA50, and extracts the self-maintenance test operation information as operation information corresponding to the barcode. Based on this operation information, the self-maintenance test operation is performed, and the result of this test is output to the display section 5. Further, the barcode displayed on the display means of the PDA by the image reading section 3 is read and analyzed, and the automatic operation information as operation information corresponding to the barcode is extracted. Based on this automatic operation information, setting operation is performed. Upon completion of the setting operation, the result of work completion is output to the display section 5. The setting opera ion is performed until the problems found out in the test process have been solved. Upon completion of this processing, the time information gained from the timer section 11 and the code information corresponding to the result of work completion are generated and displayed on the display section 5 as operation result information together with the result of work completion.

Upon receipt of an inquiry for the program version together with the signal for maintenance start operation performed by the service person in the processing of program renewal to be described later, the controller 2 outputs to the display section 5 the machine ID as the first identification information inherent to the apparatus itself and the program version information. When a program of the most renewed version is sent from the center server 30, the program rewriting is performed. Upon completion of this processing, the time information gained from the timer section 11 and the code information corresponding to the result of completion are generated and displayed on the display section 5 as operation result information together with the result of completion.

The image reading section 3 has a scanner under the contact glass where an original document is to be placed, and is used to read the image data. The scanner comprises a light source, CCD (Charge Coupled Device) and the others, and reads out the document image by formation of images based on the light reflected from the light used for scanning by illumination from the light source to the document, and by photoelectric conversion thereof. The read image data is output to the image forming section 6. The image data here is not restricted to such an image data as graphics and photos; it also contains text data such as characters and symbols.

In various forms of processing controlled by the control section 2, the RAM (Random Access Memory) provides a temporary storage for the program read out from the memory section 6, input data, output data and parameter.

The display section comprises a LCD (liquid crystal display) and EL (Electro Luminescence), and displays the statuses of various operation buttons and image data as well as identification codes on the display screen according to the display signal entered from the control section 2.

Further, the display section 5 is integrated with the input operation section 5a. The input operation section 5a comprises a pressure sensitive (resistance film pressure type) touch panel and others where transparent electrodes are arranged in a grid form. For the sake of visibility, it is preferred to be highly transmissive to light. The input operation section 5a uses the voltage value to detect the XY coordinates of the power point pressed by the finger or special-purpose touch pen. The detected position signal is output to the control unit 2 as an operation signal. Further, the input operation section 5a is provided with various operation buttons including function buttons for switching various settings.

The memory section 6 comprises a nonvolatile semiconductor memory such as EEPROM (Electrically Erasable Programmable Read-Only Memory), and stores settings and others in conformity to the various programs and functions that can be executed by the image forming apparatus 1. The memory 6 also stores the machine ID as the first identification information comprising the product number and serial number as shown in FIG. 3 as identification information of the image forming apparatus 1. The memory section 6 associates with the barcode image the operation performed by the image forming apparatus 1 and stores it as operation information.

The image forming section 7 processes the image data output from the image reading section 3 to provide zoom in/zoom out operation, rotation, position change, according to the input instruction from the input operation section 5a. The image data processed in this manner is output to the transfer section 8.

The transfer section 8 comprises a photosensitive drum, toner and ejection section.

The printing paper conforming to the size and orientation specified by the input from the input operation section 5a is fed from the paper supply section according to the output instruction from the control section 8, and electrostatic latent image formed on the photosensitive drum based on the image data input from the image forming section 7 is developed by toner, whereby a toner image is produced. Further, the transfer section 8 allows the toner image on the photosensitive drum to be transferred onto the printing paper, and to be fixed it in place. The printed matter is output from the ejection port (not illustrated).

The paper supply section 9 is configured to ensure that the printing paper fed to the transfer section 8 can be stored according to the size and orientation.

The communication controller 10 comprises modem (Modulator/DEModulator), terminal adapter and others, and provides communication control with external equipment linked to the network via the communications line such as a telephone line, ISDN line and leased line.

The timer section 11 counts the time and sends the time for operation start and completion as time information to the control section 2 in response to the instruction of the control section 2.

The following describes the operation of the present embodiment:

In this present embodiment, the image forming apparatus 1 and center server 30 store the machine ID as the first identification information (hereinafter referred to as "machine ID"). The PDA50 and center server 30 store the PDA ID as the second identification information (hereinafter referred to as "PDA ID").

With reference to the ladder chart in FIG. 4, the following describes the processing of initial setting performed among the image forming apparatus 1, PDA50 carried by the service person and center server 30 when a company installs a new image forming apparatus 1.

The control information on the initial setting operation performed in the image forming apparatus 1 in the processing of initial setting is preset and stored in the image forming apparatus 1 and center server 30 as initial setting information in the form associated with the barcode image.

In FIG. 4, individual information of the machine number or the others corresponding to the machine ID inherent to the image forming apparatus 1 to be managed is stored previously in the center server 30.

Then when the service person performs initial setting startup operation on the image forming apparatus 1 (Step S2), the image forming apparatus 1 having received the command of initial setting startup operation sends its machine ID to the display section 5 (Step S3). Recognizing the machine ID on the display, the service person enters the machine ID in the PDA50 (Step S31). The PDA50 encodes the input machine ID and PDA ID inherent to its own apparatus and sends it to the center server 30 (Step S4).

The center server 30 certifies PDA ID from the received code information (Step S5) and extracts the initial setting information preset in the form associated with the machine ID and sends it to the PDA50 (Step S6). The PDA50 extracts the barcode image information from the acquired initial setting information, and displays the barcode on display means (Step S7). Then the service person causes the displayed barcode to be read by the image reading section 3 of the image forming apparatus 1.

Having received the read command, the image forming apparatus 1 allows the barcode indicated on the display means of the PDA50 to be read by the image reading section 3. Then it analyzes the read image data and automatically starts the initial setting operation corresponding to identified barcodes. Upon completion of the initial setting operation, it generates the information on time counted on the timer section 11 and code information corresponding to the initial setting result, and displays it together with the initial setting result as operation result information on the display section 5 (Step S8).

Having recognized the displayed result of initial setting completion, the service person enters the displayed code information into the PDA50, which sends the received code information to the center server 30 (Step S9). Using the result of initial setting obtained from the received code information and the time information as maintenance information, the center server 30 renews the maintenance information of the corresponding machine ID (Step S10).

The following describes the processing of maintenance carried out among the image forming apparatus 1, PDA center carried by the service person and center server 30 with reference to the ladder chart in FIG. 5.

It is assumed that, in the processing of maintenance, the image forming apparatus 1 and center server 30 presets and stores the control information on the maintenance operation performed in the image forming apparatus 1 as maintenance information In the form associated with the barcode image.

In FIG. 5, the service person performs the maintenance startup operation on the image forming apparatus 1 (Step S21). In response to the maintenance startup operation command, the image forming apparatus 1 sends the machine ID of its own apparatus and copy count information (if required) to the display section 5 (Step S22). The service person recognizes the displayed machine ID and copy count information (if any), and enters the machine ID and copy count information in the PDA 5 (Step 21). The PDA50 encodes the received machine ID and copy count information and copy count information together with the PDA ID of its own apparatus and sends them to the center server 30 from maintenance the PDA50 (Step S23).

The center server 30 certifies the PDA ID coming from the received code information (Step S24), extracts the maintenance operation information preset in the form associated with the machine ID, and sends it to the PDA50 (Step S25). The obtained copy count information is renewed and stored as maintenance information. Then the PDA50 reads the maintenance operation information obtained from the center server 30, extracts the barcode information, and displays it on the display means (Step S26). The service person causes the displayed barcode to be read by the image reading section 3 of the image forming apparatus 1.

In response to the read command, the image forming apparatus 1 starts the following sequence of self-maintenance operations: It causes the image reading section 3 to read the barcode displayed on the display means of the PDA50, and analyzes the read image data. It then reads the maintenance operation information corresponding to the recognized barcode and automatically scans to check if there is any faulty part or part that requires replacement. Upon termination of the self-maintenance operations, the code information corresponding to the test result is generated and, together with the test result, is output to the display section 5 (Step S27).

Recognizing the displayed test result, the service person enters the displayed code information into the PDA50, which sends the received code information to the center server 30 (Step S28). The center server 30 obtains the test result information from the received code information and analyzes it. Then it reads out the automatic operation information that is preset for automatic operation, such as setting change operations for solution of problems at faulty positions, adjustment operation and recovery operation including parts replacement; and sends automatic operation information corresponding to the test result to the PDA50 (Step S29). The PDA50 extracts the barcode information from the received automatic operation information, and displays the barcode on the display means (Step S30). Then the service person causes the image reading section 3 of the image forming apparatus 1 to read the displayed barcode.

Upon receipt of the read command, the image forming apparatus 1 allows the image reading section 3 to read the barcode displayed on the display means of the PDA. Analyzing the read image data, it starts automatic operations such as setting change operations corresponding to the recognized barcode, adjustment operation and recovery operation including parts replacement. When automatic operation has been terminated, the code information corresponding to the operation result is generated and is output to the display section 5 together with the operation result (Step S31). The service person recognizes the displayed operation result and enters the displayed code information into the PDA50, which sends the received code information to the center server 30 (Step S32). Here the work from Step S29 to Step S32 is repeated until the problem detected in the result of maintenance analyzed in Step S29 is solved.

Upon completion of all operations, the image forming apparatus 1 generates the information on time counted by the timer section 11 and the code information corresponding to the operation completion result. This information is output to the display section 5 as operation result information together with the result of operation completion (Step S33). Having recognized the result of operation completion, the service person enters the displayed code information in the PDA50, which sends the received information to the center server 30 (Step S34). The center server 30 renews and stores the operation completion result obtained from the received code information as maintenance information together with the time information (Step S35).

With reference to the ladder chart in FIG. 6, the following describes the processing of program renewal to be made among the image forming apparatus, PDA50 carried by the service person and center server 30.

According to the embodiment of the FIG. 6, part of data that can be exchanged between the host terminal 40, and image forming apparatus 1 is restricted by the firewall FW in the management system 100 of FIG. 1.

In FIG. 6, the service person performs maintenance startup operation on the image forming apparatus 1, and makes an inquiry about the version of the program currently being used (Step S51). In response to the inquiry about the program version, the image forming apparatus 1 outputs to the display section 5 the machine ID of its own apparatus and the version information of the program currently being used (Step S52). Having recognized the display machine ID and program version information, the service person enters the displayed code information and program version information into the PDA50, which encodes the received code information and program version information together with the PDA ID of its own apparatus, and sends them to the center server 30 (Step S53).

The center server 30 certifies the PDA ID according to the received code information (Step S54), reads out the machine ID and the renewed program version information corresponding to the program version information and sends them to the PDA50 (Step S55). The PDA50 having obtained the renewed program version displays the renewed program version information on the display means to verify if the program is to be further renewed or not. Having received the signal for renewing the program sent by the service person, the PDA50 requests the center server 30 to renew the program (Step S56).

In response to the request to renew the program sent by the PDA50, the center server 30 sends the newest version program to the image forming apparatus 1 via the network N (Step S57). Having received the newest version program, the image forming apparatus 1 rewrites the program. After completion of processing, the image forming apparatus 1 generates the information on time counted by the timer section 11 and the code information corresponding to the program renewal completion result, and outputs it as operation result information together with the renewal completion result to the display section 5 (Step S58).

Having recognized the indicated renewal completion result, the service person sends the displayed code information to the PDA50, which forwards the received code information to the center server 30 (Step S59). The center server 30 renews and stores the completion result obtained from the received code information as maintenance information together with the time thereof (Step S60).

As described above, in the management system 100 of the present embodiment, the settings performed by the image forming apparatus, maintenance related operations are stored in the form associated with barcodes. The barcode obtained from the center server 30 is displayed on the PDA50 carried by the service person, and is read by the image forming apparatus 1, whereby the image forming apparatus 1 automatically performs the operation preset in the form associated with the barcode. This configuration eliminates the complicated work that would require a service man to perform input operations sequentially for adjustment and repair, and substantially cuts down the maintenance time.

Further, the maintenance operations are standardized, and this permits even unskilled service person to accomplish reliable maintenance. Moreover, maintenance operations are set in the form associated with the machine ID as individual information of the image forming apparatus 1. This allows the operation to be performed in conformity to the type and status of each image forming apparatus, and ensures reliable maintenance work.

The present embodiment allows use of an information communications terminal such as the PDA commonly carried by service personnel. This ensures maintenance to be performed without installation of a special external apparatus.

Moreover, transmission of data from the image forming apparatus 1 to the center server 30 is carried out by the PDA50 carried by the service person, so data can be sent and received without being restricted by the firewall configured on the LAN on the of the image forming apparatus 1, whereby security is ensured.

The description of the present embodiment represents a preferred example of a management system using the management method according to the present invention, without being the present invention being limited thereto.

For example, a barcode is used as an image for identifying the operation information in the present embodiment. However, the barcode may be replaced by a pattern or letter if the operation information can be identified.

Further, A PDA carried by service personnel is used as an information communications terminal in the present embodiment. It may be replaced by a small-sized notebook PC, cellular phone or PHS if it is an information communications terminal equipped with communications means and display means.

The operations performed by the image forming apparatus 1 may be the ones that are performed entirely by the image forming apparatus 1, or the ones including the work done by the service person, for example, when parts replacement is required.

Bluetooth may be mounted on the image forming apparatus and information communications terminal, or a wireless device may be used to receive and send the data such as machine ID.

Further, the above description refers to the step of the service person recognizing the machine ID, program version information or the like that are output and displayed on the image forming apparatus 1, and entering the displayed code information and program version information into the PDA50. This step can be replaced by an alternative step of reading the machine ID and program version information displayed as barcodes by means of an image sensor such as CCD or CMOS installed on the PDA50, and then extracting the machine ID and program version information from the optically read image data by means of an image processing function such an OCR software built in the PDA50. Or it can also be replaced by a further step of connecting an input terminal provided on the PDA50 and an output terminal provided on the image forming apparatus 1, and entering the information through this connection.

Moreover, the present embodiment uses the image forming apparatus as an apparatus to be controlled. It can be replaced, for example, by an electronic cash register, if it is equipped with communications means and image reading means.

Further, each terminal of the management system 100, detailed structure of the component and detailed operations mentioned in the present embodiment may be modified as required, without departing from the spirit of the present invention.

What is claimed is:

1. An image processing apparatus management method, wherein an external management apparatus manages an image processing apparatus via an information communications terminal, the image processing apparatus management method comprising:

transmitting, from the information communications terminal to the external management apparatus, first identification information inherent to the image processing apparatus, which is inputted into the information communications terminal, and second identification information stored in the information communications terminal in advance;

authenticating, in the external management apparatus, the transmitted second identification information based on second identification information previously stored in the external management apparatus;

acquiring, in the external management apparatus, previously stored operation information of the image processing apparatus that is associated with the first identification information;

transmitting, from the external management apparatus to the information communications terminal, the acquired operation information of the image processing apparatus;

displaying, on a display of the information communications terminal, image information based on the operation information of the image processing apparatus;

setting the display of the information communications terminal at a reading position of the image processing apparatus;

reading, by the image processing apparatus, the image information displayed on the display set at the reading position of the image processing apparatus by using an image reading section of the image processing apparatus;

analyzing the read image information, in the image processing apparatus; and performing one of an initial setting operation, a maintenance operation and a program update operation corresponding to the operation information of the image processing apparatus based on a result of analysis, in the image processing apparatus.

2. The image processing apparatus management method according to claim 1, wherein the operation information instructs at least one of:

an operation of storing into a storage device of the external management apparatus user information on a user of the image processing apparatus, an operation of changing a setting of the image processing apparatus, an operation of outputting a status of the image processing apparatus, and an operation of carrying out self-maintenance by the image processing apparatus.

3. The image processing apparatus management method according to claim 1, further comprising:

acquiring, in the image processing apparatus, a result of the operation performed by the image processing apparatus;

transmitting the result of the operation to the external management apparatus from the information communications terminal; and recording the result of operation, in the external management apparatus.

4. The image processing apparatus management method according to claim 3, further comprising:

acquiring time information in the image processing apparatus;

generating management information based on the result of the operation and the time information, in the image processing apparatus; and transmitting the management information from the information communications terminal to the external management apparatus.

* * * * *